United States Patent
Kim et al.

(10) Patent No.: US 8,735,017 B2
(45) Date of Patent: May 27, 2014

(54) MEMBRANE-ELECTRODE ASSEMBLY FOR FUEL CELL, METHOD OF MANUFACTURING MEMBRANE-ELECTRODE ASSEMBLY FOR FUEL CELL, AND FUEL CELL SYSTEM

(75) Inventors: Hee-Tak Kim, Yongin-si (KR); Sung-Yong Cho, Yongin-si (KR); Tae-Yoon Kim, Yongin-si (KR); Sang-Il Han, Yongin-si (KR); Kah-Young Song, Yongin-si (KR); Geun-Seok Chai, Yongin-si (KR); Myoung-Ki Min, Yongin-si (KR)

(73) Assignee: Samsung SDI Co., Ltd (KR)

( * ) Notice: Subject to any disclaimer, the term of this patent is extended or adjusted under 35 U.S.C. 154(b) by 375 days.

(21) Appl. No.: 12/909,693

(22) Filed: Oct. 21, 2010

(65) Prior Publication Data

US 2011/0223515 A1    Sep. 15, 2011

Related U.S. Application Data

(60) Provisional application No. 61/312,590, filed on Mar. 10, 2010.

(51) Int. Cl.
*H01M 4/86* (2006.01)

(52) U.S. Cl.
USPC .......................................................... 429/465

(58) Field of Classification Search
None
See application file for complete search history.

(56) References Cited

U.S. PATENT DOCUMENTS

| | | | |
|---|---|---|---|
| 6,391,487 | B1 | 5/2002 | Totsuka |
| 7,316,794 | B2 | 1/2008 | O'brien |
| 7,498,097 | B2 | 3/2009 | Ueda et al. |
| 7,700,211 | B2 | 4/2010 | Natamura et al. |
| 7,964,676 | B2 | 6/2011 | Lee et al. |
| 2005/0181267 | A1 | 8/2005 | Mitsuta et al. |
| 2006/0068268 | A1 | 3/2006 | Olmeijer |
| 2006/0154127 | A1 | 7/2006 | Eritate et al. |
| 2008/0087322 | A1 | 4/2008 | Park et al. |
| 2009/0162724 | A1* | 6/2009 | Olmeijer ......................... 429/33 |
| 2009/0263699 | A1* | 10/2009 | Sadasue et al. ................. 429/30 |

FOREIGN PATENT DOCUMENTS

| | | | |
|---|---|---|---|
| CN | 1953268 A | | 4/2007 |
| JP | 04-264367 A | | 9/1992 |
| JP | 06-084528 A | | 3/1994 |
| JP | 07-130372 A | | 5/1995 |
| JP | 07-147162 A | | 6/1995 |

(Continued)

OTHER PUBLICATIONS

English translation of Abstract of JP2000195527.*

(Continued)

*Primary Examiner* — Patrick Ryan
*Assistant Examiner* — Wyatt McConnell
(74) *Attorney, Agent, or Firm* — Knobbe, Martens, Olson & Bear LLP

(57) ABSTRACT

A membrane-electrode assembly for a fuel cell is disclosed. The membrane-electrode assembly may include a polymer electrolyte membrane, an adhesive layer disposed on the polymer electrolyte membrane and a catalyst layer formed, as part of the adhesive layer. The polymer electrolyte membrane, the adhesive layer and the catalyst layer may be positioned between a cathode substrate and an anode substrate. The cathode may include a cathode substrate and the anode may include an anode substrate. A method for manufacturing a membrane-electrode assembly and a system incorporating a membrane-electrode assembly are also disclosed.

19 Claims, 5 Drawing Sheets

(56) References Cited

FOREIGN PATENT DOCUMENTS

| | | |
|---|---|---|
| JP | 09-180740 A | 7/1997 |
| JP | 11-016584 A | 1/1999 |
| JP | 2000-195527 A | 7/2000 |
| JP | 2000-208151 A | 7/2000 |
| JP | 2000195527 * | 7/2000 |
| JP | 2000-285932 A | 10/2000 |
| JP | 2002-208414 A | 7/2002 |
| JP | 2004-172095 A | 6/2004 |
| JP | 2004-253399 A | 9/2004 |
| JP | 2005-011590 A | 1/2005 |
| JP | 2005-063832 A | 3/2005 |
| JP | 2005-507150 A | 3/2005 |
| JP | 2005-108604 A | 4/2005 |
| JP | 2005-190780 A | 7/2005 |
| JP | 2007-087888 A | 4/2007 |
| JP | 2007-224304 A | 9/2007 |
| JP | 2009-134987 A | 6/2009 |
| KR | 10-2007-0033538 A | 3/2007 |
| KR | 10-2007-0098325 A | 10/2007 |
| KR | 10-2007-0100693 A | 10/2007 |
| KR | 10-0854712 B1 | 8/2008 |
| KR | 10-2008-0101180 A | 11/2008 |
| WO | WO 99/45606 A1 | 9/1999 |
| WO | WO 2005/034270 A1 | 4/2005 |
| WO | WO 2006/029185 A2 | 3/2006 |
| WO | WO 2008/053770 A1 | 5/2008 |
| WO | WO2008053770 * | 5/2008 |

OTHER PUBLICATIONS

Office Action issued Dec. 4, 2012 by the Japanese Patent Office in corresponding JP-2010-286592.
KIPO Office Action issued Sep. 24, 2012 in corresponding Korean Patent Application No. 10-2010-0119165.
Extended European Search Report issued Jul. 24, 2013 in related European Application No. EP 11 25 0150.
Chinese Office Action issued May 14, 2013 by the SIPO in corresponding CN-201010574015.0.; with English translation.
Second Office Action issued Jan. 26, 2014 by the SIPO in corresponding Chinese Application No. CN 201010574015.0.

* cited by examiner

MEMBRANE-ELECTRODE ASSEMBLY FOR FUEL CELL, METHOD OF MANUFACTURING MEMBRANE-ELECTRODE ASSEMBLY FOR FUEL CELL, AND FUEL CELL SYSTEM

CROSS-REFERENCE TO RELATED APPLICATIONS

This application is a non-provisional of U.S. Application No. 61/312,590, filed Mar. 10, 2010, the contents of which are hereby incorporated by reference in their entirety.

BACKGROUND

1. Field of the Invention

This disclosure relates to a membrane-electrode assembly for a fuel cell, a method of manufacturing a membrane-electrode assembly for a fuel cell and a fuel cell system.

2. Description of the Related Art

A fuel cell is a power generation system for producing electrical energy through an electrochemical reduction-oxidation reaction of hydrogen included in a hydrocarbon-based material and oxygen supplied separately. Typical examples of fuel cells include a polymer electrolyte membrane fuel cell ("PEMFC") and a direct oxidation fuel cell ("DOFC"). Polymer electrolyte fuel cells include a stack as the main body of a fuel cell and generate electrical energy through an electrochemical reaction between hydrogen supplied from a reformer and oxygen from an air pump or a fan. The direct oxidation fuel cell generates electrical energy through an electrochemical reaction between a fuel and oxygen supplied separately.

In a fuel cell, a stack includes several to scores of stacked unit cells, and each unit cell includes a membrane-electrode assembly ("MEA") and a separator. The MEA includes a polymer electrolyte membrane, a pair of catalyst layers disposed on both sides of the polymer electrolyte membrane and gas diffusion layers disposed outside of the catalyst layers.

SUMMARY OF CERTAIN INVENTIVE ASPECTS

In one aspect, a membrane-electrode assembly for a fuel cell has improved proton transport and adhesion strength at an interface by maximizing an adhesion area between a polymer electrolyte membrane and a catalyst layer.

In another aspect, a method of fabricating a membrane-electrode assembly having improved proton transport and adhesion strength at an interface by maximizing an adhesion area between a polymer electrolyte membrane and a catalyst layer is provided.

In another aspect, a fuel cell system having improved output due to decreased interface resistance is provided.

In another aspect, a membrane-electrode assembly for a fuel cell includes, for example, a polymer electrolyte membrane, an adhesive layer disposed on the polymer electrolyte membrane and a catalyst layer formed to overlap with the adhesive layer.

In some embodiments, the polymer electrolyte membrane, the adhesive layer and the catalyst layer are positioned between a cathode substrate and an anode substrate. In some embodiments, the catalyst layer is a cathode catalyst layer. In some embodiments, the catalyst layer is an anode catalyst layer. In some embodiments, the adhesive layer has an average thickness of between about 20 nm to about 1,000 nm. In some embodiments, the catalyst layer formed as part of the adhesive layer has an average thickness ranging from about 1% to about 10% of the thickness of the catalyst layer. In some embodiments, the adhesive layer is formed of, for example, a polymer selected from the group including, for example, a binder for the catalyst layer, a polymer for the polymer electrolyte membrane, and one or more combinations thereof. In some embodiments, the adhesive layer is formed of a proton conductive perfluoro polymer.

In some embodiments, the catalyst layer is formed of, for example, a metal catalyst selected from the group including platinum, ruthenium, osmium, a platinum-ruthenium alloy, a platinum-osmium alloy, a platinum-palladium alloy, a platinum-M alloy (M is a transition element selected from the group consisting of Ga, Ti, V, Cr, Mn, Fe, Co, Ni, Cu, Zn, and a combination thereof) and one or more combinations thereof. In some embodiments, the polymer electrolyte membrane is formed of for example, a polymer including a main chain selected from the group including, for example, aryleneether, arylenesulfone, arylenesulfide, benzimidazole, imide, etherimide, aryleneethersulfone, aryleneetherketone, aryleneether-etherketone, phenylquinoxaline, and a combination thereof, and a proton conductive group. In some embodiments, the polymer electrolyte membrane is formed of, for example, a polymer including a structural unit represented by the following Chemical Formula 1:

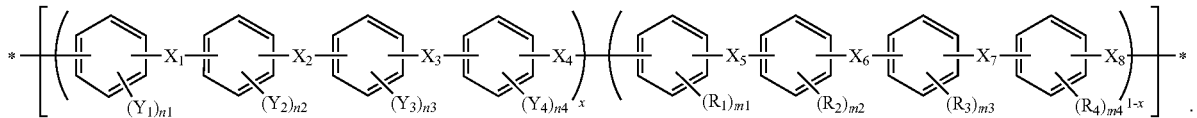

In the above Chemical Formula 1, $X_1$ to $X_8$ are selected from the group including O, S, CO, $SO_2$ and CRR', R and R' are hydrogen, a C1 to C10 alkyl group or a C1 to C10 fluoroalkyl group, $Y_1$ to $Y_4$ are selected from the group including hydrogen, a $C_1$ to $C_{10}$ alkyl group, a $C_1$ to $C_{10}$ fluoroalkyl group or a proton conductive group, at least one of $Y_1$ to $Y_4$ is a proton conductive group, n1 to n4 are integers ranging from 1 to 4, $R_1$ to $R_4$ are hydrogen, a $C_1$ to $C_{10}$ alkyl group or a $C_1$ to $C_{10}$ fluoroalkyl group, m1 to m4 are integers ranging from 1 to 4, and x may range from between about 10 mol % to about 90 mol %.

In some embodiments, a membrane-electrode assembly for a fuel cell has improved proton transport and increased adhesion strength at an interface by maximizing an adhesion area on the interface of a polymer electrolyte membrane and a catalyst layer.

In another aspect, a method of manufacturing a membrane-electrode assembly for a fuel cell includes, for example, disposing an adhesive layer on a catalyst layer disposed on a cathode or an anode and forming a polymer electrolyte membrane on the adhesive layer to form a catalyst layer as part of the adhesive layer.

In some embodiments, the adhesive layer is disposed using a gel-phase adhesive layer composition. In some embodiments, the adhesive layer is disposed on the catalyst layer by a spray-coating. In some embodiments, the adhesive layer has an average thickness of between about 20 nm to about 1000 nm. In some embodiments, the adhesive layer is formed of a polymer selected from the group including, for example, a binder for the catalyst layer, a polymer for the polymer electrolyte membrane and one or more combinations thereof. In some embodiments, the adhesive layer is formed of a proton conductive perfluoro polymer.

In another aspect, a fuel cell stack includes, for example, an electrical generator having a membrane-electrode assembly sandwiched between two separators. In some embodiments, the catalyst layer of the membrane-electrode assembly is a cathode catalyst layer. In some embodiments, the catalyst layer of the membrane-electrode assembly is an anode catalyst layer.

In another aspect, a fuel cell system includes at least one electrical generator, a fuel supplier and an oxidizing agent supplier. In some embodiments, the electrical generator includes a membrane-electrode assembly for a fuel cell. In some embodiments, the electrical generator includes a separator. In some embodiments, a fuel cell system has improved output due to the decreased interface resistance.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

DETAILED DESCRIPTION OF CERTAIN INVENTIVE EMBODIMENTS

Figure 1:
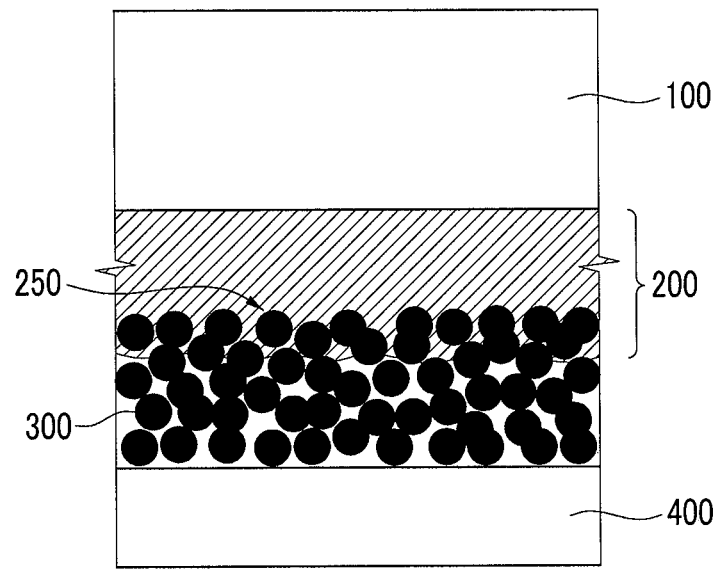
FIG. 1 is a schematic diagram depicting the interface structure of a polymer electrolyte membrane, an adhesive layer and a catalyst layer in a membrane-electrode assembly for a fuel cell according to one embodiment.

In the following detailed description, only certain exemplary embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements. Certain embodiments will be described in more detail with reference to the accompanying drawings, so that a person having ordinary skill in the art can readily make and use aspects of the present disclosure.

As used herein, when a specific definition is not otherwise provided, the term "arylene" refers to a $C_6$ to $C_{30}$ arylene, the term "alkyl" refers to a $C_1$ to $C_{10}$ alkyl, and the term "alkoxy" refers to a $C_1$ to $C_{10}$ alkoxy.

A membrane-electrode assembly for a fuel cell according to one embodiment may include, for example, a cathode and an anode facing each other, a polymer electrolyte membrane interposed between the cathode and the anode and an adhesive layer disposed between the polymer electrolyte membrane and a catalyst layer. The catalyst layer and the adhesive layer may have an interface where the catalyst layer or catalyst particles are formed to overlap with and/or to permeate into at least a portion of the adhesive layer. The cathode may include, for example, a cathode substrate and a cathode catalyst layer. The anode may include, for example, an anode substrate and an anode catalyst layer. In some embodiments, the cathode catalyst layer is the catalyst layer. In some embodiments, the anode catalyst layer is the catalyst layer FIG. 1 is a schematic diagram of the interface structure of a polymer electrolyte membrane, an adhesive layer and a catalyst layer or catalyst particles 300 in a membrane-electrode assembly for a fuel cell. As depicted in FIG. 1, a membrane-electrode assembly for a fuel cell may include, for example an adhesive layer 200 between a polymer electrolyte membrane 100 and catalyst particles 300. The membrane-electrode assembly depicted in FIG. 1 also includes a substrate 400. The catalyst particles 300 and the adhesive layer 200 have an interface 250 where the catalyst particles 300 are formed to overlap with and/or to permeate into the adhesive layer 200.

The adhesive layer 200 fills an empty space between the catalyst particles 300 and the polymer electrolyte membrane 100, and thus can maximize an area where the catalyst particles 300 contact the polymer electrolyte membrane 100. Since there is no empty space between the polymer electrolyte membrane 100 and the catalyst particles 300, but there is a larger interface between the catalyst layer and the adhesive layer 200 along the surface curve of the catalyst particles 300, the adhesive layer 200 can increase an ion transport pathway and improve adhesion strength.

The adhesive layer may have an average thickness ranging from about 20 nm to about 1,000 nm and in another embodiment, from about 100 nm to about 500 nm. When the adhesive layer has a thickness within the range, the adhesive layer is permeated into the catalyst layer more deeply than a surface roughness of a catalyst layer, preventing resistance increase. In other words, the adhesive layer not only fills the pores directly at the surface (i.e. surface recesses), but also fills underlying surface pores of the catalyst layer to a predetermined depth.

A catalyst layer may partially overlap with and/or partially permeate the adhesive layer in an average thickness range of between about 1% and about 10% based on the entire thickness of the catalyst layer or in a thickness range of between about 2% and about 5%. When the catalyst layer has a permeation thickness within the range, it may strongly combine the catalyst layer and the adhesive layer. Such a strong combination between the catalyst layer and the adhesive layer may result in improved output performance.

The adhesive layer may be formed of one or more of a polymer, a binder for the catalyst layer, a polymer for the polymer electrolyte membrane and combinations thereof.

For example, when a polymer electrolyte membrane is formed of a polyarylene ether polymer and the catalyst layer is formed of a proton conductive perfluoro polymer, the polymer electrolyte membrane and catalyst layer has an interface. At the interface the polymer electrolyte membrane and catalyst layer might be separated due to a contraction/expansion rate difference of the polyarylene ether polymer and the proton conductive perfluoro polymer. A proton conductive perfluoro polymer included in a catalyst layer as a binder may directly contact a small area of the polymer electrolyte membrane. Further, adhesion strength is low at an interface without the proton conductive perfluoro polymer. High temperature and pressure assist adhering polyarylene ether polymer having with a high softening point. Nevertheless, the proton conductive perfluoro polymer included in the catalyst layer may be changed in shape and deteriorated due to high temperature and pressure.

In one embodiment, an adhesive layer disposed at an interface between the polymer electrolyte membrane and catalyst layer improves interface adherence.

When the adhesive layer be formed of, for example, a proton conductive perfluoro polymer, the adhesive layer can be adhered to a catalyst layer at a lower temperature than a softening point of a polymer of a polymer electrolyte membrane. This results in prevention of changes and degradation of the catalyst layer.

The polymer electrolyte membrane may be formed of a polymer including, for example, a main chain selected from the group including, for example, aryleneether, arylenesulfone, arylenesulfide, benzimidazole, imide, etherimide, aryleneethersulfone, aryleneetherketone, aryleneether-etherketone, phenylquinoxaline and combinations thereof, and a proton conductive group. The proton conductive group may be a functional group selected from the group including, for example, a sulfonic acid group, a carboxylic acid group, a phosphoric acid group, a phosphonic acid group and one or more derivatives thereof.

The polymer electrolyte membrane may be formed of a polymer including a structural unit represented by the following Chemical Formula 1.

conductive group, n1 to n4 are integers ranging from 1 to 4, $R_1$ to $R_4$ are hydrogen, a $C_1$ to $C_{10}$ alkyl group, or a $C_1$ to $C_{10}$ fluoroalkyl group, m1 to m4 are integers ranging from 1 to 4, and x ranges from about 10 mol % to about 90 mol % or about 20 mol % to about 80 mol %.

The proton conductive group may be a functional group selected from the group including, for example, a sulfonic acid group, a carboxylic acid group, a phosphoric acid group, a phosphonic acid group and one or more derivatives thereof.

The catalyst layer may include a metal catalyst. The metal catalyst may be selected from the group including, for example, platinum, ruthenium, osmium, a platinum-ruthenium alloy, platinum-osmium alloy, a platinum-palladium alloy, a platinum-M alloy (M is a transition element selected from the group consisting of gallium (Ga), titanium (Ti), vanadium (V), chromium (Cr), manganese (Mn), iron (Fe), cobalt (Co), nickel (Ni), copper (Cu), zinc (Zn) and one or more combinations thereof), and one or more combinations thereof.

The catalyst may be supported by a carrier. The carrier may be selected from the group including, for example, a carbon-based material, an inorganic material particulate and one or more combinations thereof. In particular, the carbon-based material may be formed of, for example, graphite, denka black, ketjen black, acetylene black, carbon nanotube, carbon nanofiber, carbon nanowire, carbon nanoball, activated carbon, or the like. The inorganic material particulate may be formed of, for example, alumina, silica, zirconia, titania, and the like.

The catalyst layer may also be formed of a binder to improve proton transport and adherence. The binder may be formed of, for example, a polymer resin having proton conductivity, but preferably, any polymer resin having a proton conductive group. The proton conductive group may be selected from the group including, for example, a sulfonic acid group, a carboxylic acid group, a phosphoric acid group, a phosphonic acid group and one or more derivatives thereof at the side chain. In particular, it may be formed of at least one proton conductive polymer selected from the group including, for example, a proton conductive group-containing fluorine-based polymer, a proton conductive group-containing benzimidazole-based polymer, a proton conductive group-containing imide-based polymer, a proton conductive group-containing etherimide-based polymer, a proton conductive group-containing phenylenesulfide-based polymer, a proton conductive group-containing sulfone-based polymer, a proton conductive group-containing ethersulfone-based polymer, a proton conductive group-containing etherketone-based polymer, a proton conductive group-containing ether-etherketone-based polymer, or a proton conductive group-

[Chemical Formula 1]

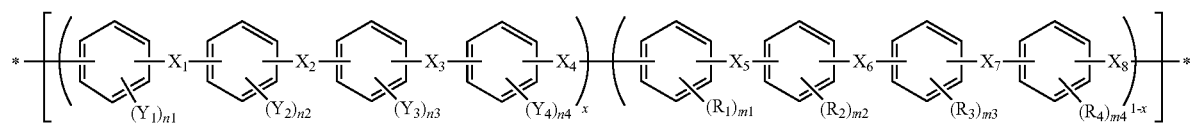

In the above Chemical Formula 1, $X_1$ to $X_8$ are selected from the group including, for example, O, S, CO, $SO_2$, and CRR' (where R and R' are hydrogen, a $C_1$ to $C_{10}$ alkyl group, or a $C_1$ to $C_{10}$ fluoroalkyl group), $Y_1$ to $Y_4$ are selected from the group including, for example, hydrogen, a $C_1$ to $C_{10}$ alkyl group, a $C_1$ to $C_{10}$ fluoroalkyl group, or a proton conductive group, provided that at least one of $Y_1$ to $Y_4$ is a proton containing phenylquinoxaline-based polymer, and preferably, at least one proton conductive polymer selected from the group including, for example, poly(perfluorosulfonic acid), poly(perfluorocarboxylic acid), a sulfonic acid group-containing copolymer of tetrafluoroethylene and fluorovinylether, a sulfonic acid group-containing sulfide polyetherketone, a sulfonic acid group-containing aryl ketone, a sulfonic acid group-containing poly(2,2'-m-phenylene)-5,5'-bibenzimidazole, or a sulfonic acid group-containing poly(2,5-benzimidazole).

The proton conductive polymer may be formed of a positive ion exchange group including, for example, Na, K, Li, Cs or tetrabutyl ammonium substituted for H at the side chain. When Na is substituted for hydrogen (H) at the side chain of an ion exchange group, NaOH may be used to prepare a catalyst composition. When tetrabutyl ammonium is substituted for H, tetrabutylammonium hydroxide may be used. K, Li, or Cs may also be substituted for H by using an appropriate compound. This substitution method is well-known in this related field and may not be illustrated in detail here. In addition, the proton conductive polymer including Na, K, Li, Cs or tetrabutyl ammonium substituted for H may be sulfonized again, when a catalyst layer is treated with sulfuric acid and, thus converted into a proton type.

The binder resin may be used singularly or as a mixture, and in addition, may be selectively used with a non-conductive compound to improve adherence to a polymer electrolyte membrane. It may be controlled in a usage amount for the purpose.

The non-conductive compound may be selected from the group including, for example, polytetrafluoroethylene (PTFE), a tetrafluoroethylene-hexafluoropropylene copolymer (FEP), a tetrafluoroethylene-perfluoro alkylvinylether copolymer (PFA), ethylene/tetrafluoroethylene (ETFE), an ethylenechlorotrifluoro-ethylene copolymer (ECTFE), polyvinylidenefluoride, a polyvinylidenefluoride-hexafluoropropylene copolymer (PVdF-HFP), dodecylbenzenesulfonic acid and sorbitol.

The electrode substrate may support an electrode and diffuse both a fuel and an oxidizing agent into a catalyst layer, so that the fuel and the oxidizing agent can easily reach the catalyst layer. The electrode substrate may be conductive and may be formed of, for example, carbon paper, carbon cloth, carbon felt, or metal cloth (a porous film formed of metal fiber or a metal film formed on the surface of a polymer fiber cloth).

In addition, the electrode substrate may be formed of a fluorine-based resin treated with a water-repellent. The water-repellent may be configured to prevent reactant diffusion efficiency deterioration by water generated when a fuel cell is operated. The fluorine-based resin may be formed of polytetrafluoroethylene, polyvinylidene fluoride, polyhexafluoropropylene, polyperfluoroalkylvinylether, polyperfluorosulfonylfluoridealkoxyvinyl ether, fluorinated ethylene propylene, polychlorotrifluoroethylene or a copolymer thereof.

In addition, a microporous layer may further be configured to promote reactant diffusion effects into the electrode. The microporous layer may be formed of, for example, a conductive powder with a small particle diameter. The microporus layer may be formed of, for example, carbon powder, carbon black, acetylene black, activated carbon, carbon fiber, fullerene, carbon nanotube, carbon nanowire, carbon nanohorn or carbon nanoring.

The microporous layer may be coated by a composition including, for example, a conductive powder, a binder resin or a solvent on the electrode substrate. The binder resin may be formed of polytetrafluoroethylene, polyvinylidenefluoride, polyhexafluoropropylene, polyperfluoroalkylvinylether, polyperfluorosulfonylfluoride, alkoxyvinyl ether, polyvinylalcohol, celluloseacetate or a copolymer thereof. The solvent may include an alcohol such as ethanol, isopropylalcohol, n-propylalcohol, butanol and the like, water, dimethyl acetamide, dimethylsulfoxide, N-methylpyrrolidone, tetrahydrofuran and the like. The coating method may include, for example, screen printing, spray coating or doctor blade application depending on the viscosity of a composition.

Another embodiment of the present disclosure provides a method of manufacturing a membrane-electrode assembly for a fuel cell. The method includes, for example, disposing an adhesive layer on a polymer electrolyte membrane, combining the polymer electrolyte membrane coated with the adhesive layer and a cathode or an anode including a catalyst layer or disposing an adhesive layer on the catalyst layer formed in a cathode or an anode and combining the catalyst layer coated with the adhesive layer and a polymer electrolyte membrane. In other words, the adhesive layer may be disposed on either a polymer electrolyte membrane or a catalyst layer first.

The adhesive layer may be disposed using a gel-phase adhesive layer composition. The gel-phase adhesive layer composition may be formed of a polymer and/or a solvent. The polymer may be selected from the group including, for example, a binder for the catalyst layer, a polymer for the polymer electrolyte membrane and one or more combinations thereof. The solvent may include, for example, an alcohol such as ethanol, isopropylalcohol, n-propylalcohol, butanol and the like, water, dimethyl acetamide, dimethylsulfoxide, N-methylpyrrolidone, tetrahydrofuran and the like.

The adhesive layer may be disposed on the polymer electrolyte membrane by spray coating an adhesive layer composition. When the adhesive layer composition is spray-coated, the adhesive layer does not excessively permeate inside the catalyst layer, but instead is coated on the surface of the catalyst layer, filling the surface pores. During the spray-coating, a polymer solution may be partially volatilized during the spray-coating and coated with higher viscosity on the surface of a catalyst layer. Accordingly, it may be less permeated inside the catalyst layer and selectively fills the pores disposed on the surface of a catalyst layer.

The adhesive layer may be between about 20 nm to about 1,000 nm thick or between about 100 nm to about 500 nm thick. The adhesive layer may be formed of a polymer selected from the group including, for example, a binder for the catalyst layer, a polymer for the polymer electrolyte membrane and one or more combinations thereof. In some embodiments, the polymer may be formed of, for example a proton conductive perfluoro polymer such as poly(perfluorosulfonic acid).

Another embodiment provides a fuel cell system including at least one electrical generator, a fuel supplier and an oxidizing agent supplier. The electrical generator may include the above-described membrane-electrode assembly for a fuel cell and a separator.

The electrical generator plays a role of generating electricity through oxidation of a fuel and reduction of an oxidizing agent. The fuel supplier is configured to supply the electrical generator with a fuel, while the oxidizing agent supplier is configured to provide the electrical generator with an oxidizing agent such as oxygen or air.

The fuel may include a hydrogen or hydrocarbon fuel in a gas or liquid state. The hydrocarbon fuel may include, for example, methanol, ethanol, propanol, butanol or natural gas.

Figure 2:
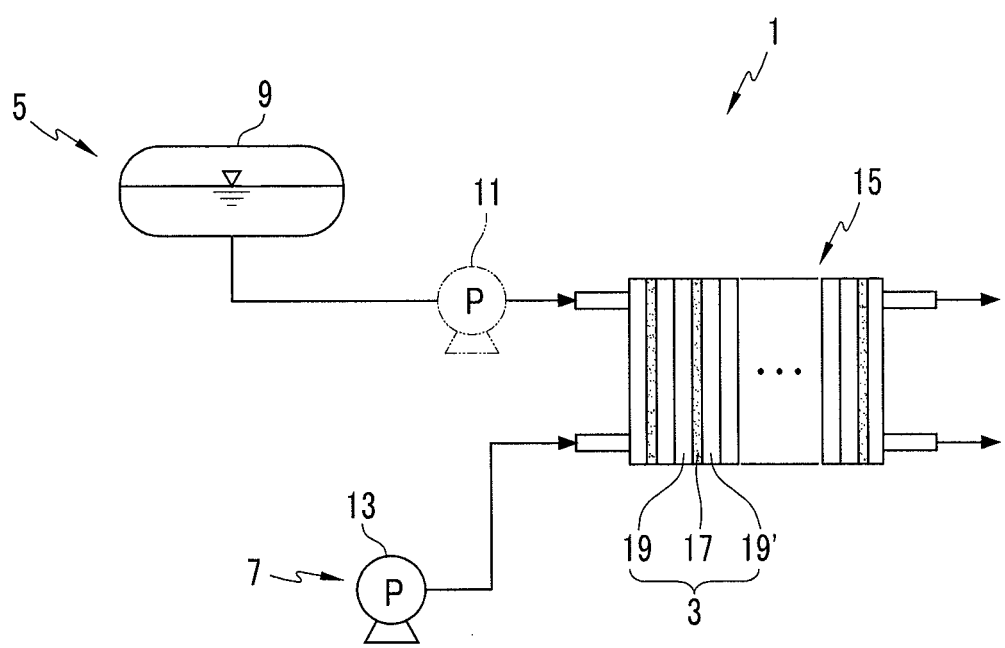
FIG. 2 is a schematic view depicting the structure of a fuel cell system according to another embodiment.

FIG. 2 depicts a schematic structure of the fuel cell system, which will be described in detail with the reference to this accompanying drawing as follows. FIG. 2 depicts a system for supplying an electrical generator with a fuel and an oxidizing agent using a pump, but the fuel cell system is not limited thereto and may adopt a diffusion method instead of a pump.

The fuel cell system 1 may include at least one electrical generator 3 configured to generate electricity through oxidation of a fuel and reduction of an oxidizing agent. The fuel cell system 1 may further include a fuel supplier 5 configured to supply the electrical generator 3 with a fuel and an oxidizing agent supplier 7 configured to supply the electrical generator 3 with an oxidizing agent. The fuel supplier 5 may be equipped with a fuel tank 9 storing a fuel and a fuel pump 11 connected to the fuel tank 9. The fuel pump 11 discharges a fuel stored in a fuel tank 9 with a predetermined pumping power. The oxidizing agent supplier 7 may be configured to supply the electrical generator 3 with an oxidizing agent and may be equipped with at least one oxidizing agent pump 13 configured to inhale an oxidizing agent with a predetermined pumping power.

The electrical generator 3 may include a membrane-electrode assembly 17 configured to oxidize a fuel and configured to reduce an oxidizing agent. The electrical generator 3 may further include separators 19 and 19' configured to supply the fuel and the oxidizing agent at both sides of the membrane-electrode assembly 17. One or more electrical generators 3 may form part of a stack 15.

Hereinafter, examples are used to illustrate other aspects in more detail. However, the following examples are employed for explanation but do not limit the present disclosure.

EXAMPLE 1

A ionomer powder was prepared by spray-drying and lyophilizing a Nafion® (DuPont Co.) ionomer dispersion solution. 0.86 g of the ionomer powder was dissolved in 7.71 g of dipropylene glycol and 2 g of a catalyst powder was added thereto. The mixture was agitated and then 7.54 g of water was added thereto. The resulting mixture was sufficiently stirred to prepare a composition for a catalyst layer. As for a cathode catalyst, a TEC36E51 PtCo/C catalyst made by Tanaka Co., Ltd. was used. As for an anode catalyst, TEC61E54 PtRu/C made by Tanaka Co., Ltd. was used.

The composition for the cathode catalyst layer and the anode catalyst layer were respectively coated on a cathode substrate and an anode substrate. The composition was then sufficiently vacuum-dried at about 60° C. The dried resulting products were sufficiently boiled in 100° C. water and dried again, fabricating films for catalyst layers and thereby a cathode and an anode were fabricated.

Herein, the cathode includes a loading amount of 0.25 mg/cm$^2$ and the anode includes an amount of 0.35 mg/cm$^2$.

Then, an adhesive layer composition was prepared by putting 20 parts by weight of Nafion® based on 100 parts by weight of water/isopropylalcohol mixed in a ratio of 50/50 and agitating the mixture. This adhesive layer composition was spray-coated on the catalyst layers of the cathode and anode at a room temperature in an amount of 0.1 mg/cm$^2$ to form a 500 nm-thick adhesive layer on the surface of the catalyst layer.

The cathode and anode were disposed on both sides of a polymer electrolyte membrane including a sulfonized polyarylene ether-based polymer of Chemical Formula 2, and were hot-rolled together at 150° C. to adhere an electrolyte membrane to the cathode and anode, thereby fabricating a membrane-electrode assembly.

[Chemical Formula 2]

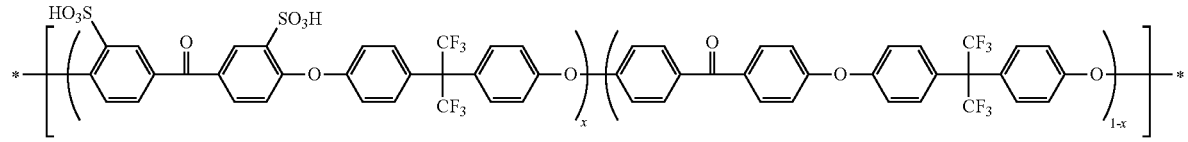

In the above Chemical Formula 2, x is 50 mol %.

The membrane-electrode assembly was inserted between gaskets and also, between two separators including a gas passage channel and a cooler channel having a predetermined shape, and then, compressed between end plates to fabricate a single cell.

Figure 3:
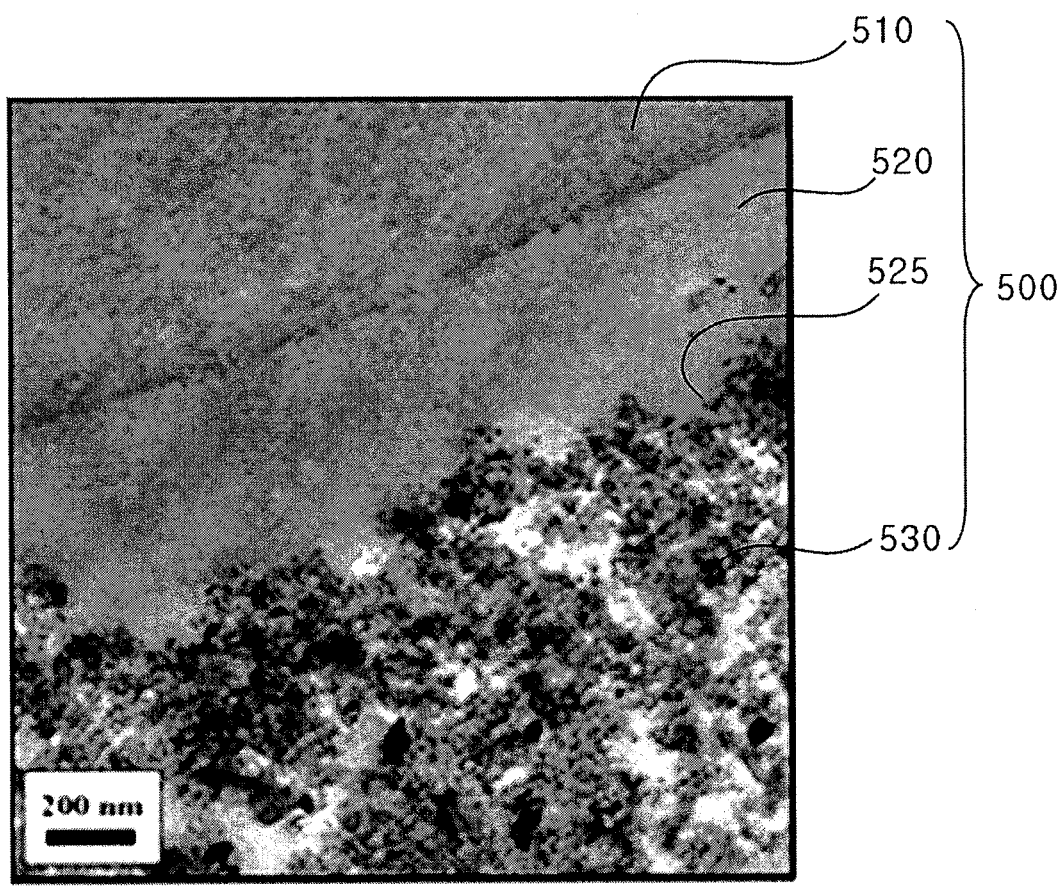
FIG. 3 is a scanning electron microscope photograph depicting the interface structure of a polymer electrolyte membrane, an adhesive layer, and a catalyst layer in a membrane-electrode assembly for a fuel cell according to one embodiment.

FIG. 3 is a scanning electron microscope ("SEM") photograph of the interface structure 500 of a polymer electrolyte membrane 510, an adhesive layer 520 and a catalyst layer 530 in a membrane-electrode assembly for a fuel cell. As depicted in FIG. 3, an interface 525 indicates the area where the adhesive layer 520 is formed to overlap with or permeate into the catalyst layer 530.

EXAMPLE 2

A membrane-electrode assembly and a single cell were fabricated according to the same method as Example 1 except for forming an 800 nm-thick adhesive layer on the surface of a catalyst layer by spray-coating an adhesion composition in an amount of 0.15 mg/cm$^2$ instead of forming a 500 nm-thick adhesive layer on the surface of a catalyst layer by spray-coating an adhesion composition in an amount of 0.1 mg/cm$^2$.

COMPARATIVE EXAMPLE 1

A membrane-electrode assembly and a single cell were fabricated according to the same method as Example 1 except no adhesive layer was formed on the surface of a catalyst layer.

Evaluation 1: Output Characteristics

Air and hydrogen were injected into each cathode and anode of the single cell according to Examples 1 to 2 and Comparative Example 1. Then, the single cells were measured regarding current-voltage characteristics.

The cells were maintained at 60° C. and respectively had air and hydrogen usage rates of 50% and 83.3%. The gas was controlled to maintain humidity of 80% based on 60° C. The cathode and the anode were controlled to maintain a high back pressure.

Figure 4:
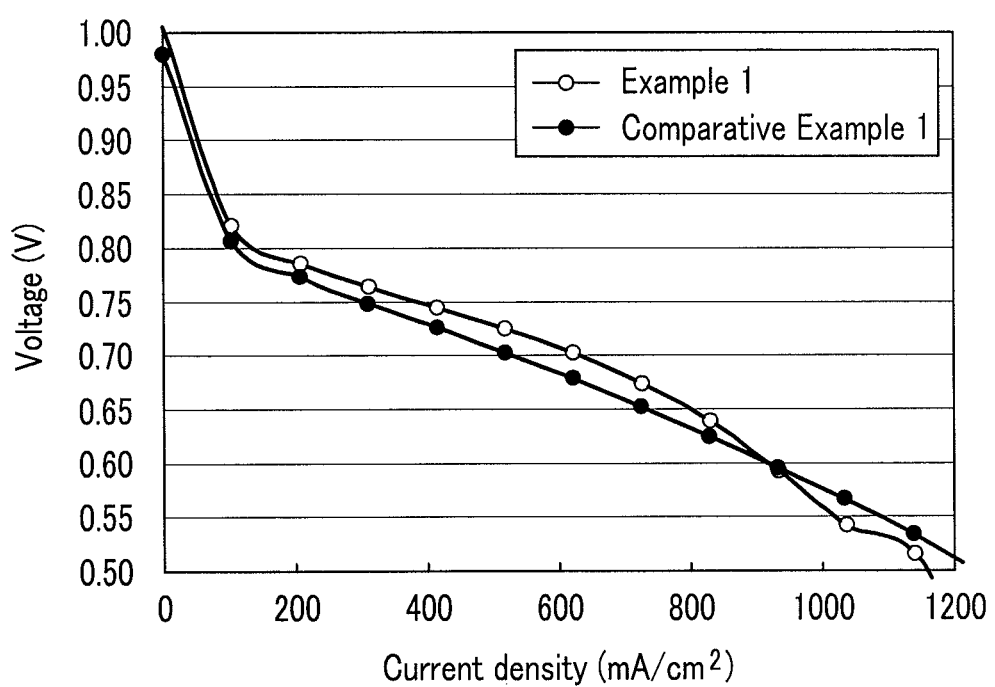
FIG. 4 is a graph depicting a current-voltage characteristic comparison of single cells according to Example 1 and Comparative Example 1.

FIG. 4 is a graph showing a current-voltage characteristic comparison of single cells according to Example 1 and Comparative Example 1.

Referring to FIG. 4, Example 1 had an excellent output characteristic compared with Comparative Example 1. Comparing their output performances at 0.7 V, Comparative Example 1 had 371 mW/cm$^2$, while Example 1 had 441 mW/cm$^2$. Thus, Example 1 had about 19% better output performance than Comparative Example 1.

Figure 5:
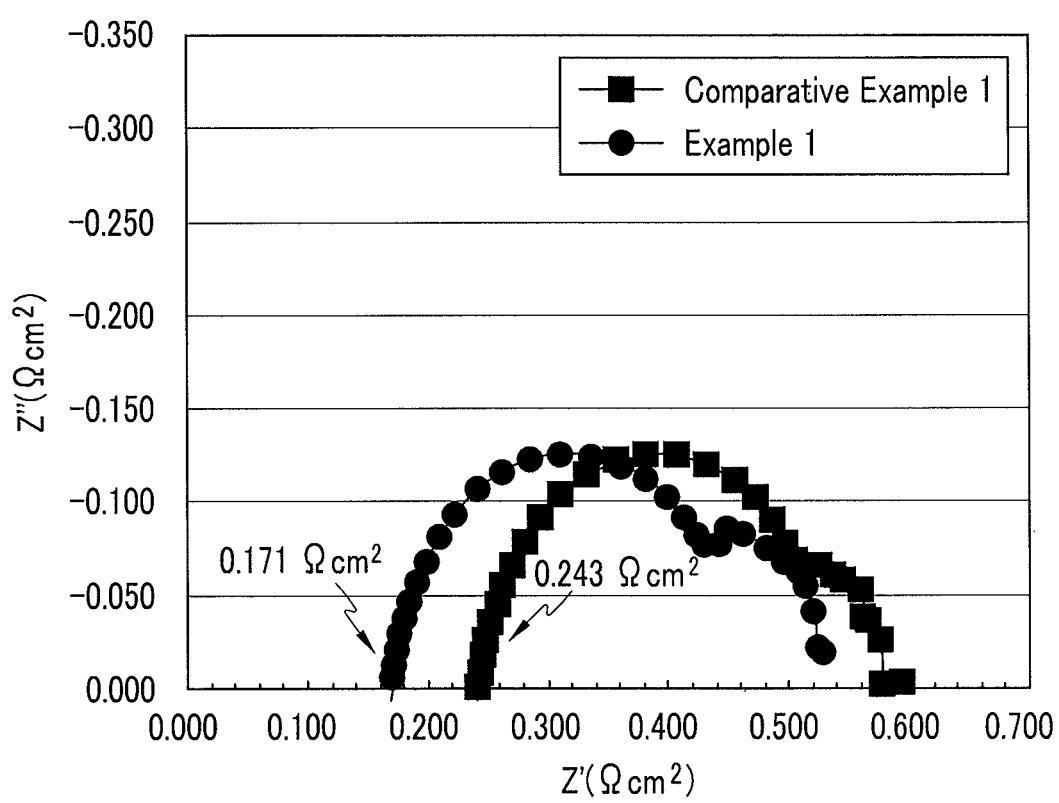
FIG. 5 is a graph depicting an AC impedance comparison of single cells according to Example 1 and Comparative Example 1 under a 300 mA/cm$^2$ constant current condition.

FIG. 5 is a graph depicting an AC impedance comparison of Example 1 and Comparative Example 1 under conditions of a 300 mA/cm$^2$ constant current. The x axis is the real number (Z') of impedance, while the y axis is the imaginary number (Z") of the impedance. The real number value at a point where the impedance curve line meets the x axis is ohmic resistance, which depicts a resistance component including membrane and interface resistances. The single cell according to Example 1 had interface resistance of 0.171 Ωcm$^2$, while the single cell according to Comparative Example 1 had interface resistance of 0.243 Ωcm$^2$.

Accordingly, the single cell according to Example 1 had 30% lower resistance than that of Comparative Example 1. Example 1 and Comparative Example 1 included the same membrane but differed in including the adhesive layer on the interface. Accordingly, their difference in ohmic resistance comes from the difference in interface resistance. The adhesive layer disposed on the interface improved proton transportation on the interface and thereby decreased interface resistance, but improved output performance.

Evaluation 2: Interface Adherence

The single cells according to Examples 1 and 2 and Comparative Example 1 were evaluated regarding interface adherence by being maintained at 60° C. and injecting nitrogen into each cathode and anode. The nitrogen was repeatedly injected by being humidified and dried, and thus repeatedly caused contraction and expansion of a membrane-electrode assembly due to hydration and drying. The nitrogen was 100% humidified and dried and repeatedly injected every 10 minutes. The humidified and dried nitrogen was injected once per cycle (20 minutes in total). After 5000 cycles in total, ohmic resistances of the cells were compared. The results are provided in the following Table 1.

TABLE 1

| | Ohmic resistance [Ω cm$^2$] before Acceleration evaluation | Ohmic resistance [Ω cm$^2$] after Acceleration evaluation | Increase rate [%] |
| --- | --- | --- | --- |
| Example 1 | 0.171 | 0.203 | 18.7 |
| Example 2 | 0.195 | 0.205 | 5.1 |
| Comparative Example 1 | 0.243 | 0.982 | 404.3 |

As shown in Table 1, the single cell of Comparative Example 1 including no adhesive layer had 404.3% increased resistance compared to initial resistance. The single cell according to Example 1 including an adhesive layer in an amount of 0.1 mg/cm$^2$ on the catalyst layer had 18.7% increased resistance compared to initial resistance. Comparison of Comparative Example 1 and Example 1 shows an interface adhesion stability improvement due to the adhesive layer coated on the catalyst layer. The single cell according to Example 2 showed a low ohmic resistance increase rate.

While the present invention has been described in connection with certain exemplary embodiments, it will be appreciated by those skilled in the art that various modifications and changes may be made without departing from the scope of the present disclosure. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A membrane-electrode assembly for a fuel cell, comprising:
    a polymer electrolyte membrane;
    an adhesive layer disposed on the polymer electrolyte membrane; and
    a catalyst layer formed to overlap with the adhesive layer such that the adhesive layer permeates into the catalyst layer,
    wherein the polymer electrolyte membrane, the adhesive layer and the catalyst layer are positioned between a cathode substrate and an anode substrate,
    wherein the polymer electrolyte membrane is formed of a polymer including a structural unit represented by the following Chemical Formula 1:

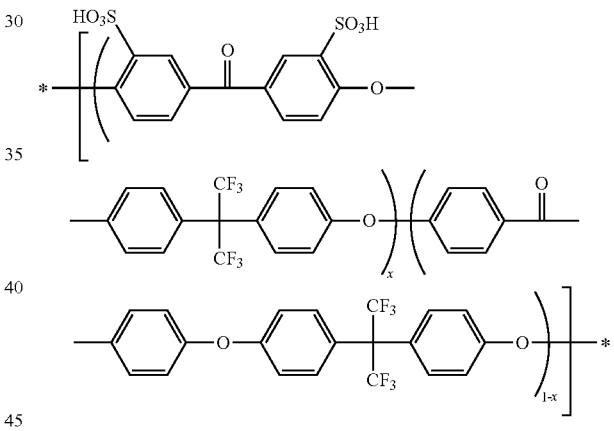

and wherein in the above Chemical Formula 1 x is about 50 mol %.

2. The membrane-electrode assembly of claim 1, wherein the catalyst layer is a cathode catalyst layer.

3. The membrane-electrode assembly of claim 1, wherein the catalyst layer is an anode catalyst layer.

4. The membrane-electrode assembly of claim 1, wherein the adhesive layer has an average thickness of between about 20 nm to about 1,000 nm.

5. The membrane-electrode assembly of claim 1, wherein the catalyst layer formed as part of the adhesive layer has an average thickness ranging from about 1% to about 10% of the thickness of the catalyst layer.

6. The membrane-electrode assembly of claim 1, wherein the adhesive layer is formed of a polymer selected from the group consisting of a binder for the catalyst layer, a polymer for the polymer electrolyte membrane, and a combination thereof.

7. The membrane-electrode assembly of claim 1, wherein the adhesive layer is formed of a proton conductive perfluoro polymer.

8. The membrane-electrode assembly of claim 1, wherein the catalyst layer is formed of a metal catalyst selected from the group consisting of platinum, ruthenium, osmium, a platinum-ruthenium alloy, a platinum-osmium alloy, a platinum-palladium alloy, a platinum-M alloy (M is a transition element selected from the group consisting of Ga, Ti, V, Cr, Mn, Fe, Co, Ni, Cu, Zn, and a combination thereof), and a combination thereof.

9. The membrane-electrode assembly of claim 1, wherein the polymer electrolyte membrane is formed of a polymer including a main chain selected from the group consisting of aryleneether, arylenesulfone, arylenesulfide, benzimidazole, imide, etherimide, aryleneethersulfone, aryleneetherketone, aryleneether-etherketone, phenylquinoxaline, and a combination thereof, and a proton conductive group.

10. A method of manufacturing a membrane-electrode assembly for a fuel cell, the method comprising:
 disposing an adhesive layer on a catalyst layer disposed on a cathode or an anode; and
 forming a polymer electrolyte membrane on the adhesive layer to form a catalyst layer as part of the adhesive layer, wherein the adhesive layer is disposed using a gel-phase adhesive layer composition or wherein the adhesive layer is disposed on the catalyst layer by spray-coating to fill surface pores in the catalyst layer, wherein the polymer electrolyte membrane is formed of a polymer including a structural unit represented by the following Chemical Formula 1:

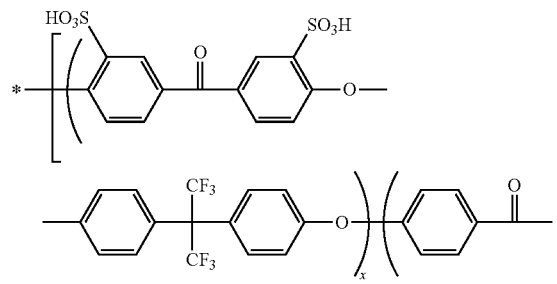

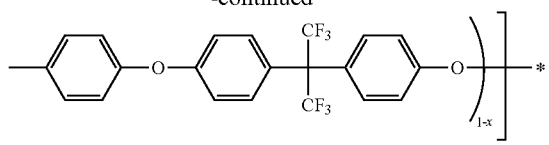

and wherein in the above Chemical Formula 1 x is about 50 mol %.

11. The method of claim 10, wherein the adhesive layer is disposed using a gel-phase adhesive layer composition.

12. The method of claim 10, wherein the adhesive layer is disposed on the catalyst layer by a spray-coating.

13. The method of claim 10, wherein the adhesive layer has an average thickness of between about 20 nm to about 1000 nm.

14. The method of claim 10, wherein the adhesive layer is formed of a polymer selected from the group consisting of a binder for the catalyst layer, a polymer for the polymer electrolyte membrane, and a combination thereof.

15. The method of claim 10, wherein the adhesive layer is formed of a proton conductive perfluoro polymer.

16. A fuel cell system, comprising:
 at least one electrical generator; and
 a fuel supplier and an oxidizing agent supplier,
 wherein the electrical generator comprises the membrane-electrode assembly for a fuel cell of claim 1 and a separator.

17. A fuel cell stack, comprising an electrical generator, wherein the electrical generator comprises a membrane-electrode assembly of claim 1 sandwiched between two separators.

18. The fuel cell stack of claim 17, wherein the catalyst layer is a cathode catalyst layer.

19. The fuel cell stack of claim 17, wherein the catalyst layer is an anode catalyst layer.

* * * * *